(12) United States Patent
Bickford et al.

(10) Patent No.: US 8,726,201 B2
(45) Date of Patent: May 13, 2014

(54) METHOD AND SYSTEM TO PREDICT A NUMBER OF ELECTROMIGRATION CRITICAL ELEMENTS

(75) Inventors: Jeanne P. Bickford, Essex Junction, VT (US); Peter A. Habitz, Hinesburg, VT (US); Baozhen Li, South Burlington, VT (US); Paul S. McLaughlin, Essex Junction, VT (US); Dileep N. Netrabile, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 12/780,138

(22) Filed: May 14, 2010

(65) Prior Publication Data
US 2011/0283249 A1  Nov. 17, 2011

(51) Int. Cl.
*G06F 17/50* (2006.01)

(52) U.S. Cl.
USPC .............................. 716/52; 716/113; 716/115

(58) Field of Classification Search
USPC ..................... 716/15, 19, 22, 36, 52, 113, 115
See application file for complete search history.

(56) References Cited

U.S. PATENT DOCUMENTS

| | | | | |
|---|---|---|---|---|
| 6,038,383 A * | 3/2000 | Young et al. | ................... | 716/113 |
| 2008/0015827 A1 * | 1/2008 | Tryon et al. | ........................ | 703/2 |
| 2008/0086708 A1 * | 4/2008 | Rittman | ............................ | 716/11 |
| 2008/0086709 A1 * | 4/2008 | Rittman | ............................ | 716/11 |
| 2009/0224356 A1 * | 9/2009 | Chandra | ........................ | 257/499 |
| 2011/0173583 A1 * | 7/2011 | Barwin et al. | ................. | 716/106 |

FOREIGN PATENT DOCUMENTS

WO  WO 2009/019063 A1  2/2009

OTHER PUBLICATIONS

Chanhee Oh et al., "A Methodology for Chip-Level Electromigration Risk Assessment and Product Qualification", IEEE, 2004, 6 pages.
Baozhen Li et al., "Minimum Void Size and 3-Parameter . . . Interconnects", IBM Research Report, RC23679 (WO507-212) Jul. 29, 2005, 9 pages.
Baozhen Li et al., "Application of Three-Parameter Lognormal . . . Analysis", IBM Research Report, RC23680 (WO507-213) Jul. 29, 2005, pp. 1-17.
Insight Into Using the Electromigration Black Equation for MTTF Estimates, Design for Reliability Software Company (http://www.dfrsoft.com/DfRSoft_Electromigration.pdf), 1 pg.

* cited by examiner

*Primary Examiner* — Jack Chiang
*Assistant Examiner* — Mohammed Alam
(74) *Attorney, Agent, or Firm* — Richard Kotulak; Roberts Mlotkowski Safran & Cole, P.C.

(57) ABSTRACT

A method and system to predict a number of electromigration critical elements in semiconductor products. This method includes determining critical element factors for a plurality of library elements in a circuit design library using a design tool running on a computer device and based on at least one of an increased reliability temperature and an increased expected current. The method also includes determining a number of critical elements in a product based on: (i) numbers of respective ones of the plurality of library elements comprised in the product, and (ii) the critical element factors.

21 Claims, 4 Drawing Sheets

METHOD AND SYSTEM TO PREDICT A NUMBER OF ELECTROMIGRATION CRITICAL ELEMENTS

FIELD OF THE INVENTION

The present invention relates to a method of designing semiconductor products and, more particularly, to a method and system to predict a number of electromigration critical elements.

BACKGROUND

Electromigration is a significant reliability failure mechanism for advanced semiconductor circuit interconnects. Electromigration is a well known phenomenon in which, generally speaking, atoms of a metal feature are displaced due to the electrical current passing through the feature. The migration of atoms can result in voids and/or hillocks in the feature, which can increase electrical resistance, cause shorts, and ultimately result in failure of the feature, which negatively impact reliability of the integrated circuit.

To prevent EM failure before a product lifetime, circuit designers typically abide by a maximum use current density ($J_{use}$) for metal vias and lines. The maximum use current density ($J_{use}$) is conventionally projected based on experimental stress data. For a predefined product end of life (EOL) failure target, chip level EM failure is determined by a failure probability of each circuit and the total number of circuits with EM concerns. Each circuit with EM concerns may contribute differently to the chip failure due to a different design current density and/or other EM characteristics such as redundancy.

As dimensions of features (e.g., pads, wires, interconnects, vias, etc.) continue to shrink to create smaller devices, the maximum allowable current density decreases rapidly due to electromigration (EM) effects. For example, operating voltages typically scale (e.g., get smaller) at a rate slower than metal lines, which results in higher current density in metal lines. As a result, it is difficult to maintain the same $J_{use}$ for new generations of technology. The EM failure time of products decreases to almost half for each next generation at the same current density. Moreover, there is significant $J_{use}$ degradation from generation to generation. Accordingly, there is a widening gap between design needs and what the technology currently supports.

Notwithstanding, products are trending toward longer power on hours (POH) and higher operating temperatures. This requires designers to produce products with better EM characteristics. One approach for improving the EM characteristics of a product involves improving the $J_{use}$, e.g., improving the current carrying capacity of the physical structures in the circuit. Another approach involves understanding possible fail sites and optimizing circuit design based upon such better understanding. However, there is no process for accurately estimating the number of potential fail sites (e.g., "critical elements") in a semiconductor product. Instead, suppliers of IP layout elements typically provide generic estimations of numbers of critical elements in a one-size-fits-all approach. This type of approach is inadequate for accurately estimating EM-based reliability for products.

Accordingly, there exists a need in the art to overcome the deficiencies and limitations described hereinabove.

SUMMARY

In a first aspect of the invention, there is a method of optimizing integrated circuit design. The method includes determining critical element factors for a plurality of library elements in a circuit design library using a design tool running on a computer device and based on at least one of an increased reliability temperature and an increased expected current. The method also includes determining a number of critical elements in a product based on: (i) numbers of respective ones of the plurality of library elements comprised in the product, and (ii) the critical element factors.

In a second aspect of the invention, there is a system for optimizing integrated circuit design. The system includes a computer device comprising a memory and a processor. The system also includes a design tool running on the processor. The design tool is configured to: determine critical element factors for a plurality of library elements in a circuit design library based on at least one of an increased reliability temperature and an increased expected current, and determine a number of critical elements in a product based on: (i) numbers of respective ones of the plurality of library elements comprised in the product, and (ii) the critical element factors.

In a third aspect of the invention, there is a computer program product comprising computer program code embodied in a tangible storage medium. The program code is configured to cause the computer device to: determine critical element factors for a plurality of library elements in a circuit design library based on at least one of an increased reliability temperature and an increased expected current, and determine a number of critical elements in a product based on: (i) numbers of respective ones of the plurality of library elements comprised in the product, and (ii) the critical element factors.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
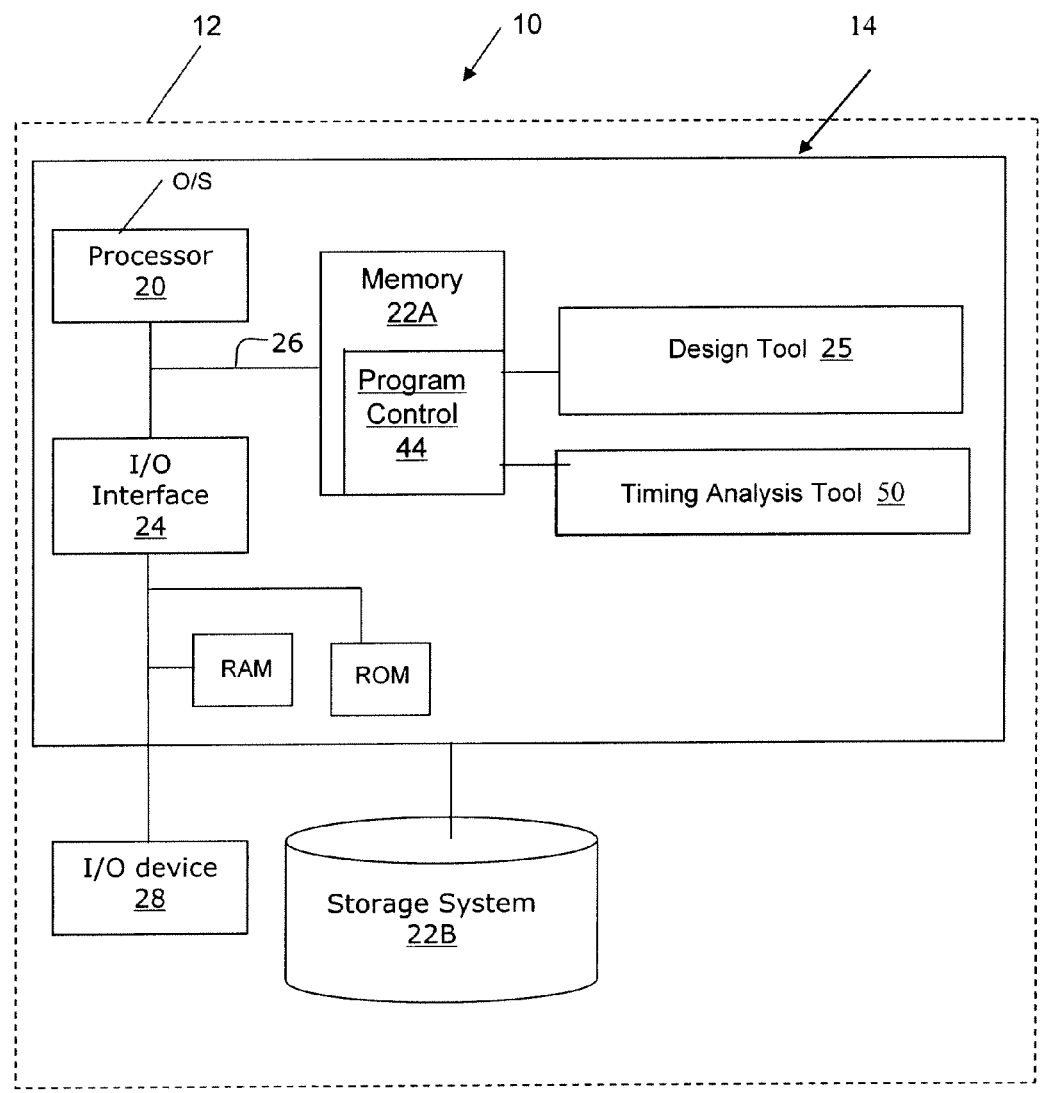
FIG. 1 shows an illustrative environment for implementing the steps in accordance with aspects of the invention.

The present invention relates to a method of designing semiconductor products and, more particularly, to a method and system to predict a number of electromigration critical elements. In embodiments, a design margin (also called a sensitivity factor) is determined for a library element by incrementally increasing the reliability temperature and/or the expected current in a design tool. The results of such incrementing may be used to determine a number of critical elements for that library element, or a power grid. For example, the incremented results may be used to establish a number of critical elements on a per-element use and/or a per-area use, which can in turn be used to estimate a number of critical elements for each product level. In this manner, implementations of the invention provide a method for accurately predicting the number of critical elements for a particular design product, which enables a designer to optimize the use of elements in a product design and also optimize use of metal layers that will have the most benefit.

To determine the number of critical EM elements on a given product (chip), the distribution of elements running at different current densities is needed. In this invention, two ways are used to determine this distribution: checking number of fails by increasing reliability temperature or increasing expected current. For any given element, if the maximum DC current exceeds the predefined limit, it is called a fail. When reliability temperature is used, the number of fails increases with reliability temperature because of the decrease in current density. The number of fails increases with current (I) increase for a constant current limit. With selected reliability temperature or expect current increase steps, the distribution of elements running at different current densities is extracted.

In accordance with aspects of the invention, implementations of the invention may operate to: determine at least one of a reliability temperature and an expected current for each library element design, use this information to determine number of critical elements for each library element; and calculate the number of critical elements for a product design by summing the products of the number of critical elements for each library element type times the number used in the product.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium. In embodiments, the computer program product comprises computer program code embodied (e.g., stored) in a tangible storage medium which, when executed on a computer device, causes the computer device to perform one or more of the processes described herein. The tangible storage medium may include, but is not limited to, a semiconductor or solid state memory, magnetic tape, a removable computer diskette, a hard drive, a random access memory (RAM), a read-only memory (ROM), a rigid magnetic disk, and an optical disk (e.g., compact disk-read only memory (CD-ROM), compact disk-read/write (CD-R/W), and DVD).

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet, or
a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third-party service provider (any of which is generally represented in FIG. 1).

The computing device 14 includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. The bus 26 provides a communications link between each of the components in the computing device 14. In addition, the computing device includes random access memory (RAM), a read-only memory (ROM), and an operating system (O/S). In general, the processor 20 executes computer program code (e.g., program control 44), which can be stored in the memory 22A and/or storage system 22B. The program control 44 controls and/or executes the processes of the invention. While executing the computer program code, the processor 20 can read and/or write data to/from memory 22A, storage system 22B, and/or I/O interface 24.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a handheld device, PDA, handset, keyboard, etc.

The computing device 14 further includes one or more tools 25. For example, the tool 25 can be a software application, analysis tool, modeling tool and/or simulation tool implemented as one or more program code in the program control 44 stored in the memory 22A as separate or combined modules. The tool may comprise a dedicated, single-purpose hardware device such as a processor, memory, etc., which implements the processes described herein. Alternatively, the computer infrastructure of FIG. 1 may be implemented as a dedicated computer infrastructure for performing the processes described herein.

The computing device 14 can also comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Critical Elements

As used herein, the term "critical element" refers to a potential fail point in an electrical circuit, e.g., integrated circuit. An IP layout element or library cell may have no, one or multiple critical elements. Moreover, the term "circuit element" as used herein may refer to an IP layout element, library cell (library element), or any other element used in integrated circuit design.

The number of EM critical elements may be used as the basis for an EM failure calculation, e.g., end of life (EOL), for a product. However, the number of critical elements is not merely the number of circuits designed at or above the $J_{use}$ limit. Instead, cumulative effects and statistical characteristics are considered in determining the number of critical elements. For example, circuit elements with current less than the $J_{use}$ limit can contribute to the EM allowance, as well. These circuits may have a lower failure probability than those at the $J_{use}$ limit, but the cumulative effect of such circuits can have a significant effect on the EM failure mode of the product as a whole. For example, a chip with zero circuit elements above the $J_{use}$ limit can still have an EM failure greater than the target value. Accordingly, critical elements may be thought of as all potential fail points, instead of just those elements at or above the $J_{use}$ limit.

A number of equivalent EM critical elements may be based on distribution statistics from a design. Where $j_i$ is the DC current density distribution for a given chip, $n_i$ is the number of circuits at $j_i$ and may be represented by Equation 1:

$$n_i = f(j_i) \quad (1)$$

The chip level CDF (cumulative failure) may be calculated based on the $j_i$ distribution and the adjusted CDF per circuit for each j, by either of Equations 2 or 3, as follows:

$$CDF(\text{chip}) = \int_0^N cdf(j) dn \quad (2)$$

$$CDF(\text{chip}) = \sum_{i=1}^{m} cdf(j_i) n_i \quad (3)$$

The number of equivalent EM critical elements may then be given by Equation 4:

$$N_{crit,eq} = \frac{CDF(\text{chip})}{CDF(\text{circuit@ } Juse)} \quad (4)$$

With knowledge of an accurate estimate of the number of equivalent EM critical elements, a designer may provide EM relief to a product design when an assessment warrants such relief. For example, based upon the product needs, such EM relief may include: a $J_{use}$ limit uplift (e.g., increase the $J_{use}$ limit), a product lifetime extension (e.g., increase the product EOL estimate), and/or overdrive at higher operating temperatures (e.g., permit higher operating temperatures for the product).

The EM limit is statistical not only in wire tolerance but also in current limit per cross section. A feature having a current density larger than the limit does not guarantee a fail. The current density limit establishes the probability that a feature (e.g., a wire or via) can fail. Moreover, the probability that a chip can fail depends on the number of features at the limit, which are referred to as segments at risk. To protect a chip, the total number of segments at risk should be under the EM limit assumption. When a designer knows the number of segments at risk, the EM limit can be adjusted to a more accurate value instead of an inaccurate value that is based on generic, one-size-fits-all estimates of numbers of critical elements. An adjusted limit is more forgiving and aids the chip design process.

In accordance with aspects of the invention, there is a methodology for accurately counting the number of wire segments at risk in a product design. In embodiments, by increasing the reliability temperature a small amount beyond its limit, the number of EM fails created is used to calculate the number of segments at risk. This method may be used for all flexible standard cell digital logic design. The number of segments at risk may be added to the EM documentation of all reused design blocks including, but not limited to, macros, RAMs, and chip image power nets. In embodiments, the EM limit is adjusted to the number of segments at risk to create design relief. Before chip release, a verification may be performed that the number of wire segments and the EM limit used have a verified relationship.

In embodiments, the number of wire segments at risk may be determined by increasing the expected current rather than the reliability temperature. Computer-based design tools, such as timing analysis tool 50 shown in FIG. 1, permit a user to adjust the reliability temperature and/or the expected current in portions of a design. In accordance with aspects of the invention, a number of segments at risk may be determined by increasing the reliability temperature and/or expected current of a design, and the EM limit may be adjusted based on the determined number of segments at risk. In implementations, this method may be used to provide design relief for the particular design. In additional embodiments, the determination of the number of segments at risk may be used to determine a sensitivity factor (e.g., design margin) for a type of circuit element. By determining a sensitivity factor for a number of types of circuit elements on a per-element and/or per-area basis, a method and tool may be provided for accurately estimating the number of critical elements in any other product design. The accurate estimates of numbers of critical elements may be used for design optimization.

Exemplary Flow Diagrams

Figure 2:
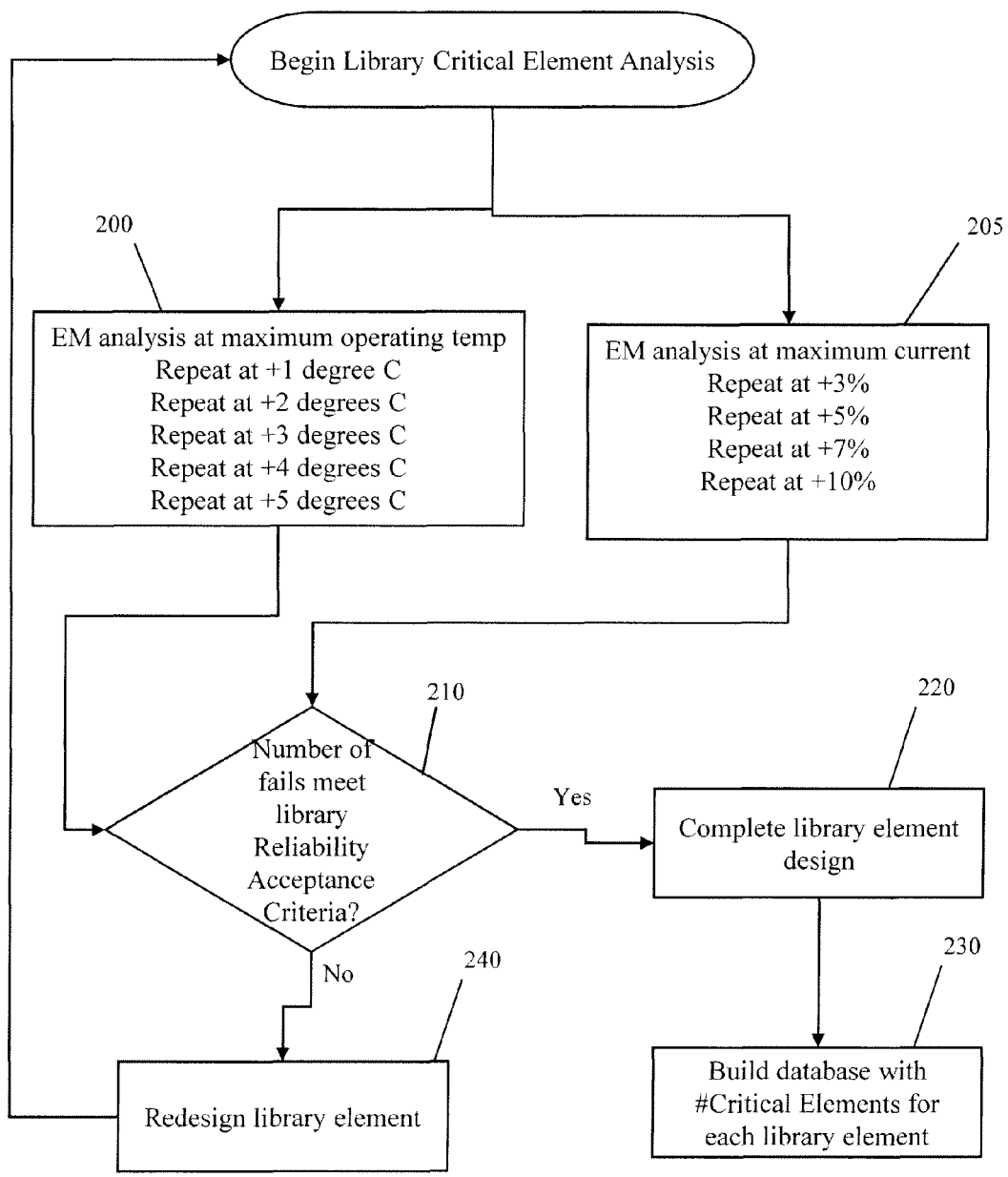
FIG. 2 and FIG. 3 show flow diagrams used for example, in semiconductor integrated circuit (IC) logic design, in accordance with aspects of the invention.
Figure 3:
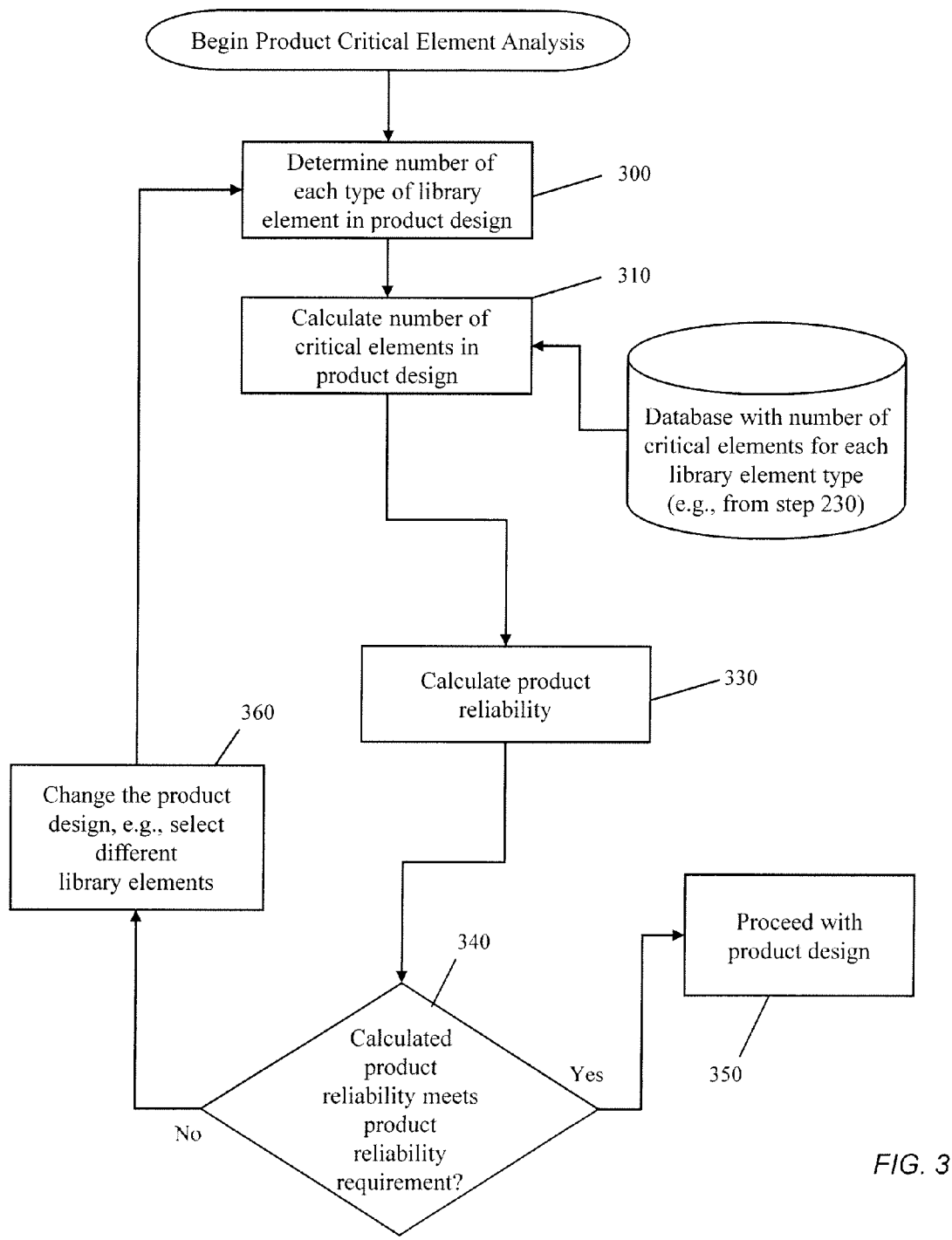
Figure 4:
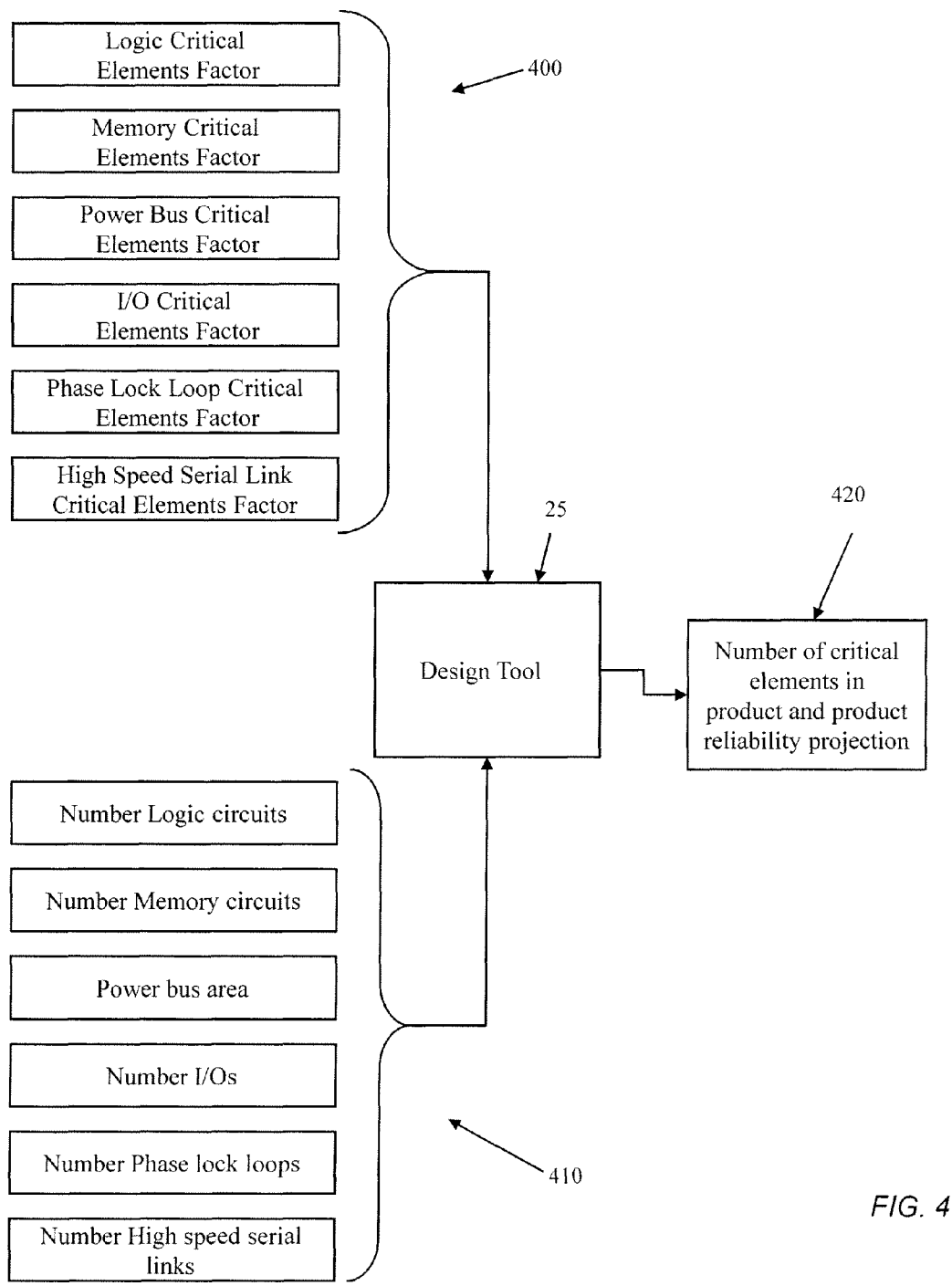
FIG. 4 shows a block diagram depicting functionality in accordance with aspects of the invention.

FIGS. 2, 3 and 4 illustrate process flows and/or block diagrams in accordance with aspects of the invention. The steps and/or blocks of FIGS. 2, 3 and 4 may be implemented in the environment of FIG. 1, for example. The flow diagrams may equally represent a high-level block diagram or a swim-lane diagram of the invention. The flowchart and/or block diagrams in FIGS. 2, 3 and 4 illustrate the architecture, functionality, and operation of possible implementations of systems, methods and computer program products according to various embodiments of the present invention. In this regard, each block in the flowchart, block diagram or swim-lane diagram may represent a module, segment, or portion of code, which comprises one or more executable instructions for implementing the specified logical function(s). It should also be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved. Each block of each flowchart and combinations of the flowchart illustration can be implemented by special purpose hardware-based systems that perform the specified functions or acts, or combinations of special purpose hardware and computer instructions and/or software, as described above.

FIG. 2 shows a flow diagram used, for example, in circuit design in accordance with aspects of the invention. At step 200, the EM exposure of each library element in a circuit design library chip is analyzed using a design tool, for example design tool 25, to determine a number of fails. The design tool may comprise or be part of other library element design tools, for example, a timing analysis tool. At step 200, the user or program logic in a processor adjusts the EM reliability temperature and determines a number of fails or segments at risk based on the adjusted temperature. The analysis at step 200 may be performed at an initial reliability temperature as a parameter used by the tool 25. In a typical embodiment, reliability temperatures would be changed in 1 degree increments for a number of points (e.g., six different points) near the maximum operating temperature for the targeted products. For example, if the maximum product operating temperature is 100 degrees C., then reliability would be assessed at 100, 101, 102, 103, 104, and 105 degrees C. The invention is not limited to this range, and any suitable amount of increase in the reliability temperature may be used within the scope of the invention.

Alternatively to step 200, at step 205 the user or program logic in a processor analyzes the EM exposure of the library element (e.g., number of fails or segments at risk) by adjusting the current using the design tool 25. In embodiments, the current would be increased by 3%, 5%, 7%, and 10% in step 205. The invention is not limited to this range, and any suitable amount of increase in the current to assess EM exposure may be used within the scope of this invention.

At step 210, a user or program logic in a processor determines whether the number of fails from step 200 meets the library element reliability acceptance criteria. If a library element does not meet the reliability acceptance criteria, the library element is redesigned in step 240. If the library element meets the reliability acceptance criteria, design of the library element is completed in step 220 and a database of each library element and its associated number of critical elements is created in step 230.

FIG. 3 shows a flow diagram used, for example, in product design in accordance with aspects of the invention. At step 300, the number of each type of library element for a proposed product design is determined. This may be performed, for example, using a design tool to analyze design data of the proposed product design. The number of critical elements in the proposed product is calculated in step 310 using the information from step 300 and the information from the library element critical circuit database constructed in step 230. The number of critical elements in the proposed product is used in step 330 to calculate a product reliability of the product design. In step 340, if the product reliability objective is not met by the calculated product reliability, then the proposed product is redesigned in step 360 and product analysis in step 300 is repeated. The product redesign may comprise, for example, selecting a different combination of library elements for the product. If the product reliability objective is met at step 340, then the proposed product design proceeds in step 350.

In accordance with aspects of the invention, the number of segments at risk determined by increasing the reliability temperature and/or the expected current (e.g., as in steps 200 and 205 described with respect to FIG. 2) can be used to determine the number of critical elements (e.g., design margin) for a library element. For example, for a particular type of logic element, a logic circuit number of critical elements may be determined by increasing the reliability temperature for that logic element and determining the number of new EM fails that occur because of the increased reliability temperature. The number of critical elements for a logic library element factor may be, for example, a number of critical elements (e.g., segments at risk determined above) divided by number of circuit gates. Moreover, the sensitivity factor may be determined using appropriate computation methods and the data described herein, e.g., a number of number of critical elements for a logic library element divided by the number of circuit gates for a particular logic library element which is available from the product design and/or timing tool. Different respective critical elements factors may be determined for different types of logic library elements.

In additional embodiments, for a particular type of memory library element, a memory number of critical elements factor may be determined by saturating the current applied to that memory element and determining the number of new EM fails per memory size that occur because of the increased current. Different respective critical elements factors may be determined for different memory elements.

In further embodiments, a power grid number of critical elements factor may be determined based on die size by changing (e.g., increasing) the current density applied to that power grid and determining the number of new EM fails per die size that occur because of the increased current. An exemplary format for a power grid sensitivity factor may be the number of critical elements per square millimeter; however, the invention is not limited to this format and any suitable format may be used within the scope of the invention.

In accordance with aspects of the invention, number of critical elements factors for HSS core elements and I/O elements may be similarly determined. In embodiments, an exemplary format the number of critical elements factor for HSS core elements is number of critical elements per link for a particular HSS core design, and an exemplary format for the number of critical elements factor for I/O elements is number of critical elements per I/O. Although specific formats the number of critical elements factors have been provided herein for illustration, the invention is not limited to these formats and any suitable formats may be used.

FIG. 4 is a block diagram depicting functionality of aspects of the invention. According to aspects of the invention, base characterizations 400 and product content 410 may be input into a design tool 25 that is configured to calculate a number of critical elements for a product design 420. In embodiments, the base characterizations 400 comprise number of critical elements factors determined as described herein, such as by increasing at least one of the reliability temperature and the expected current density for a respective element and identifying the new number of segments at risk based on the increased temperature and/or current. For example, the base characterizations 400 may comprise number of critical elements factors including, but not limited to: number of critical elements per number of circuits for a particular type of logic element, number of critical elements per type or size of memory element, number of critical elements per power bus area, number of critical elements per type of I/O element, number of critical elements per type of phase lock loop element, and number of critical elements per type of high speed serial link elements.

In embodiments, the product content 410 includes a description of the circuit elements (e.g., IP layout elements, library elements, etc.) used in a design of the product (e.g., chip). For example, the product content 410 may comprise data that indicates: number of circuits, and type of logic elements; number, size, and type of memory elements; power bus area; number and type of I/O elements; number and type of phase lock loop elements; and number and type of high speed serial link elements.

In accordance with aspects of the invention, a user may input the base characterizations 400 and/or the product content 410 into the design tool 25 using an I/O device, such as I/O device 28 described above with respect to FIG. 1. For example, a user may inputs values associated with the base characterizations 400 and/or the product content 410 using a keyboard and/or mouse. In a particular illustrative embodiment, the design tool 25 comprises an Internet-based interface (e.g., website, web client, etc.) where the user may specify the product content 410 in one or more fields of the interface. Moreover, the interface may permit the user to input one or more values of the base characterizations 400 and/or select predetermined ones of the base characterizations 400 stored in association with the design tool 25. In embodiments the design tool 25 may comprise a tool 25, such as described with respect to FIG. 1.

Table 1 shows an exemplary output of the design tool 25. Calculated parameters are shown for three different product designs (e.g., "A", "B", and "C"). The various numbers of critical elements for each type of element are calculated by the design tool 25 based on the base characterizations 400 and the product content 410. The total number of critical elements is the sum of all critical elements for a particular product.

TABLE 1

| Product | Die Size | Logic Critical elements | Memory Critical elements | Power Bus Critical elements | HSS Critical elements | I/O Critical elements | PLL Critical elements | Total Critical elements |
|---|---|---|---|---|---|---|---|---|
| A | 14.0 × 14.0 | 4,200 | 4,200 | 4,200 | 4,200 | 4,200 | 4,200 | 25,200 |
| B | 16.4 × 16.4 | 10,000 | 10,000 | 10,000 | 10,000 | 10,000 | 10,000 | 60,000 |
| C | 10.0 × 10.0 | 16,000 | 16,000 | 16,000 | 16,000 | 16,000 | 16,000 | 96,000 |

Table 2 shows another exemplary output of the design tool 25 calculated for the same three different product designs (e.g., "A", "B", and "C"). However, in Table 2, the number of critical elements per element in determined and displayed as a number of critical elements associated with the 1× layer and a number of critical elements associated with the thicker than 1× metal layers. Although only metal level 1× and g thicker than 1× are shown, it is contemplated within the scope of the invention that the number of critical elements can be determined for any desired number of design metal levels via appropriate programming in the design tool 25 and with data defining which levels the product content resides on. This provides a designer with more information for targeting efforts to improve the product design (e.g., concentrate design effort at the metal layers and/or elements where there is the most potential for improvement).

TABLE 2

| Product | Die Size | Logic Critical elements | Memory Critical elements | Power Bus Critical elements | HSS Critical elements | I/O Critical elements | PLL Critical elements | Total Critical elements |
|---|---|---|---|---|---|---|---|---|
| A | 14.0 × 14.0 | 1× = 2,100 | 1× = 2,100 | 1× = 2,100 | 1× = 2,100 | 1× = 2,100 | 1× = 2,100 | 25,200 |
|   |   | >1× = 2,100 | >1× = 2,100 | >1× = 2,100 | >1× = 2,100 | >1× = 2,100 | >1× = 2,100 |   |
| B | 16.4 × 16.4 | 1× = 5,000 | 1× = 5,000 | 1× = 5,000 | 1× = 5,000 | 1× = 5,000 | 1× = 5,000 | 60,000 |
|   |   | >1× = 5,000 | >1× = 5,000 | >1× = 5,000 | >1× = 5,000 | >1× = 5,000 | >1× = 5,000 |   |
| C | 10.0 × 10.0 | 1× = 8,000 | 1× = 8,000 | 1× = 8,000 | 1× = 8,000 | 1× = 8,000 | 1× = 8,000 | 96,000 |
|   |   | >1× = 8,000 | >1× = 8,000 | >1× = 8,000 | >1× = 8,000 | >1× = 8,000 | >1× = 8,000 |   |

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, where applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed:

1. A method of optimizing integrated circuit design, comprising:
   determining critical element factors for a plurality of library elements in a circuit design library using a design tool running on a computer device and based on at least one of an increased reliability temperature and an increased expected current; and
   determining a number of critical elements in a product based on: (i) numbers of respective ones of the plurality of library elements comprised in the product, and (ii) the critical element factors,
   wherein the determining the number of critical elements comprises determining a number of critical elements of each type of library element in the product by multiplying a number of elements of the type of library element by the critical element factor associated with the type of library element.

2. The method of claim 1, further comprising storing associations between respective ones of the critical element factors and respective ones of the plurality of library elements.

3. The method of claim 2, wherein the storing comprises storing the associations in a database lookup table.

4. The method of claim 1, further comprising summing the determined number of critical elements of each type of library element.

5. The method of claim 1, wherein the determining the critical element factors comprises analyzing electromigration (EM) exposure of the plurality of library elements at the increased reliability temperature or the increased expected current.

6. The method of claim 5, wherein the analyzing electromigration exposure comprises using the design tool to determine a number of EM fails at the increased reliability temperature or the increased expected current.

7. The method of claim 6, further comprising incrementally adjusting the increased reliability temperature.

8. The method of claim 6, further comprising incrementally adjusting the increased expected current.

9. A system for optimizing integrated circuit design, comprising:
a computer device comprising a memory and a processor; and
a design tool running on the processor, the design tool being configured to:
determine critical element factors for a plurality of library elements in a circuit design library based on at least one of an increased reliability temperature and an increased expected current; and
determine a number of critical elements in a product based on: (i) numbers of respective ones of the plurality of library elements comprised in the product, and (ii) the critical element factors,
wherein the determining the number of critical elements comprises determining a number of critical elements of each type of library element in the product by multiplying a number of elements of the type of library element by the critical element factor associated with the type of library element.

10. The system of claim 9, wherein the design tool is further configured to store associations between respective ones of the critical element factors and respective ones of the plurality of library elements.

11. The system of claim 9, wherein the design tool is further configured to sum the determined number of critical elements of each type of library element.

12. The system of claim 9, wherein the determining the critical element factors comprises analyzing electromigration (EM) exposure of the plurality of library elements at the increased reliability temperature or the increased expected current.

13. The system of claim 12, wherein the analyzing electromigration exposure comprises design tool determining a number of EM fails at the increased reliability temperature or the increased expected current.

14. A computer program product comprising computer program code embodied in a non-transitory computer readable storage medium, and wherein the computer program code, when executed on a computer device, causes the computer device to:
determine, by the computer device, critical element factors for a plurality of library elements in a circuit design library based on at least one of an increased reliability temperature and an increased expected current; and
determine, by the computer device, a number of critical elements in a product based on: (i) numbers of respective ones of the plurality of library elements comprised in the product, and (ii) the critical element factors,
wherein the determining the number of critical elements comprises determining a number of critical elements of each type of library element in the product by multiplying a number of elements of the type of library element by the critical element factor associated with the type of library element.

15. The computer program product of claim 14, wherein the computer program code further causes the computer device to store associations between respective ones of the critical element factors and respective ones of the plurality of library elements.

16. The computer program product of claim 14, wherein the determining the critical element factors comprises analyzing electromigration (EM) exposure of the plurality of library elements at the increased reliability temperature or the increased expected current.

17. The computer program product of claim 16, wherein the analyzing electromigration exposure comprises design tool determining a number of EM fails at the increased reliability temperature or the increased expected current.

18. The method of claim 1, wherein the number of critical elements is determined according to:

$$N = \frac{CDF(\text{chip})}{CDF(\text{circuit}@J_{use})}$$

where N is the number of critical elements, CDF is a chip level cumulative failure, and $J_{use}$ is a maximum use current density.

19. The method of claim 18, further comprising providing electromigration relief to a design of the product, wherein the relief comprises one of:
increasing a limit of $J_{use}$ for the product;
increasing the product end of life (EOL) estimate; and
permitting higher operating temperatures for the product.

20. The system of claim 9, wherein the number of critical elements is determined according to: a chip level cumulative failure, and a maximum use current density.

21. The computer program product of claim 14, wherein the number of critical elements is determined according to: a chip level cumulative failure, and a maximum use current density.

* * * * *